March 30, 1954   E. W. OLSON   2,673,710
APPARATUS FOR FEEDING ROPES AND CABLES THROUGH CONDUITS
Filed July 20, 1951   2 Sheets-Sheet 1
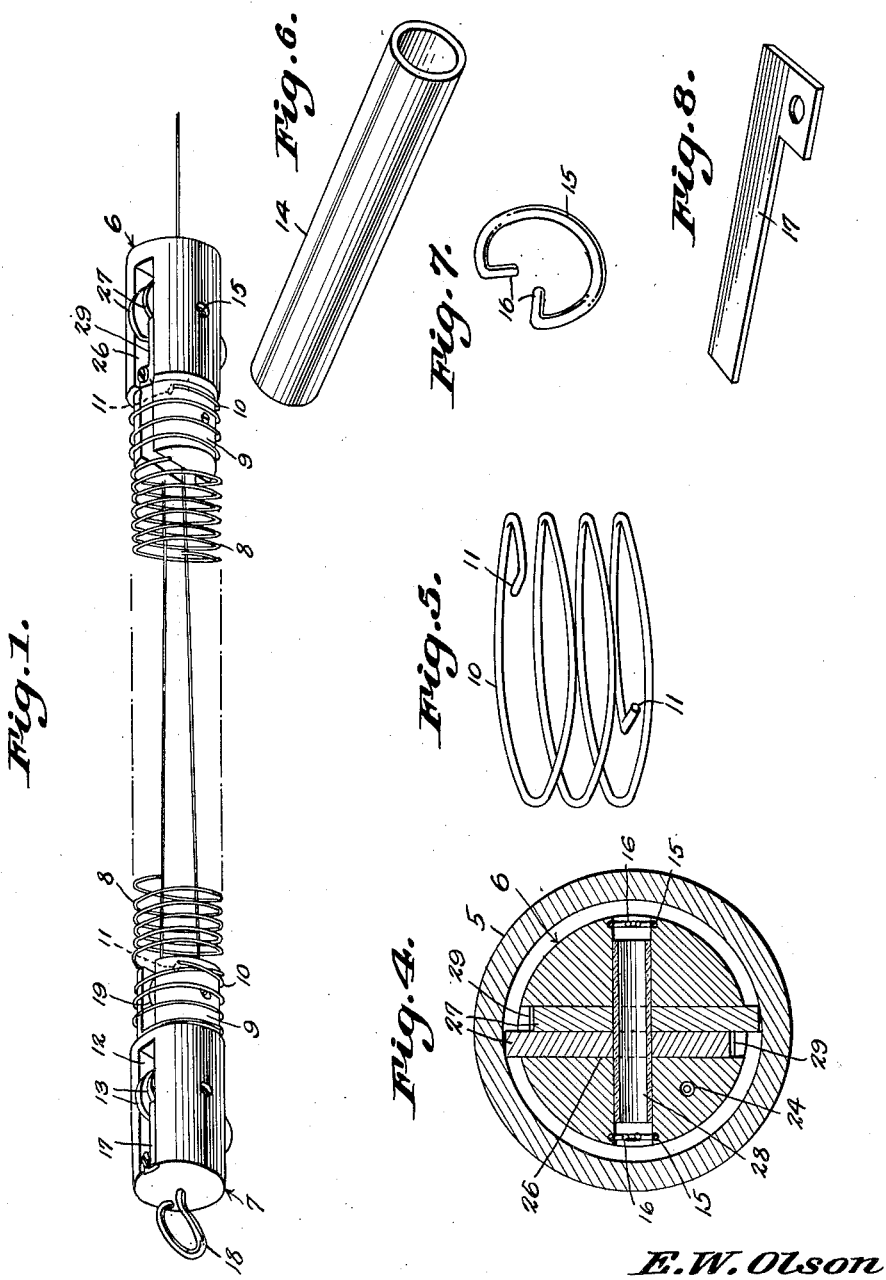
E. W. Olson
INVENTOR
BY *[signature]*
ATTORNEYS.

March 30, 1954 E. W. OLSON 2,673,710
APPARATUS FOR FEEDING ROPES AND CABLES THROUGH CONDUITS
Filed July 20, 1951 2 Sheets-Sheet 2
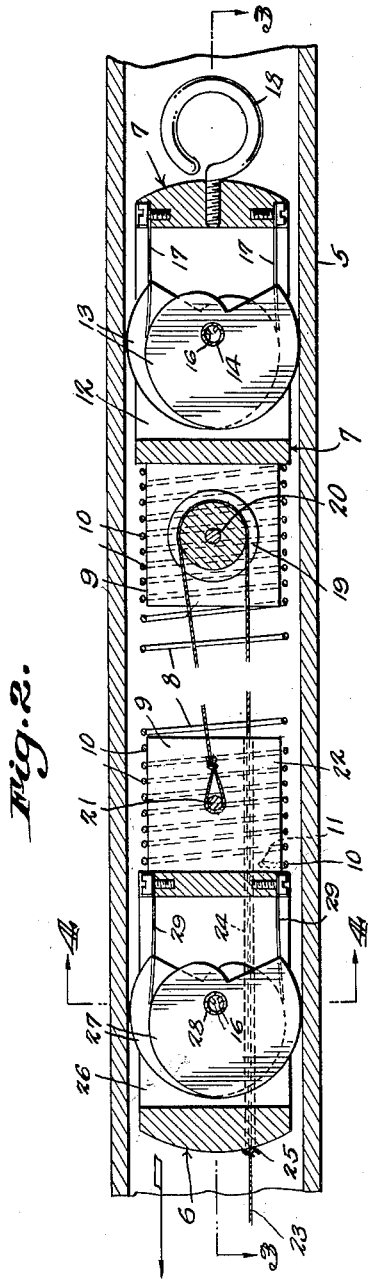
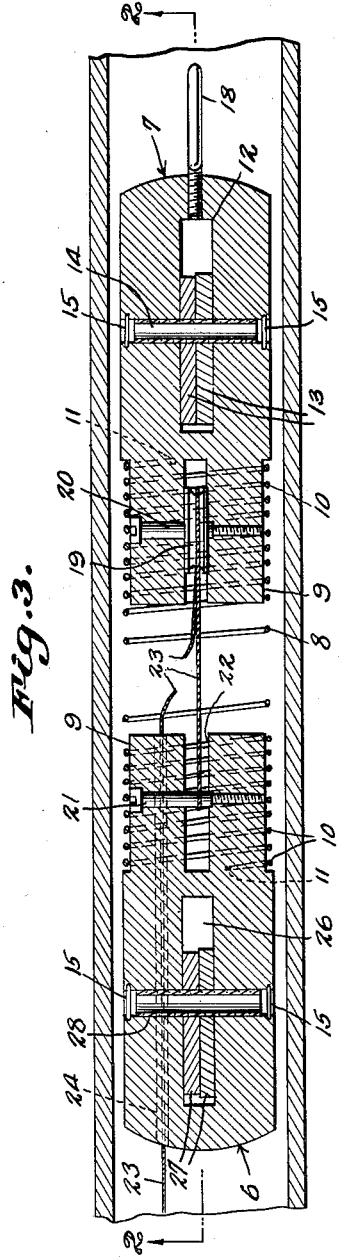
E. W. Olson
INVENTOR
BY C.A.Snow & Co.
ATTORNEYS.

Patented Mar. 30, 1954

2,673,710

UNITED STATES PATENT OFFICE 2,673,710

APPARATUS FOR FEEDING ROPES AND CABLES THROUGH CONDUITS

Edgar W. Olson, China Lake, Calif.

Application July 20, 1951, Serial No. 237,701

1 Claim. (Cl. 254—134.6)

This invention relates to an apparatus designed for feeding or threading strong cords or light cables through conduits, pipe lines or the like which can be used in pulling in wires or stronger cables, the primary object of the invention being to provide a device of this character which will operate through the conduit or pipe line with a step by step motion.

An important object of the invention is to provide a device of this character embodying a duct crawler which will overcome the friction between the duct and tape being fed through a duct which, with well known feeding or threading devices, becomes appreciable at two hundred feet or more.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is a perspective view of a cable feeding or threading device, constructed in accordance with the invention.

Fig. 2 is an enlarged sectional view taken longitudinally through the device, approximately on line 2—2 of Fig. 3.

Fig. 3 is a longitudinal sectional view taken on line 3—3 of Fig. 2.

Fig. 4 is a transverse sectional view taken on line 4—4 of Fig. 2.

Fig. 5 is a perspective view of one of the spring keepers, forming a part of the invention.

Fig. 6 is a perspective view of a shear tube on which the cams of the apparatus are mounted.

Fig. 7 is a perspective view of a spring wire shear tube retaining member.

Fig. 8 is a perspective view of one of the cam springs, designed for urging the cams into contact with the duct.

Referring to the drawings in detail, the reference character 5 indicates a duct in which the apparatus forming the subject matter of the present invention, operates to thread a wire, wire rope or cable therethrough.

The apparatus comprises the front cam assembly body 7, and the rear cam assembly body 6, the cam assembly bodies being spaced apart and connected by means of the coiled spring 8 which has its ends fitted over the reduced ends 9 of the assembly bodies, there being provided retaining springs 10 positioned around the ends of the coiled spring 8 fitted over the ends 9, securing the ends of the coiled spring 8 to the cam assembly bodies. The ends 11 of the retaining springs 10 are extended at angular positions for fitting in openings formed at opposite sides of the reduced ends 9, as clearly shown by the drawings. The coiled spring 8 is of the expansible type, and normally acts to urge the cam assembly bodies away from each other. The assembly body 7 is formed with a cut-out portion 12 extended therethrough, the cut-out portion 12 providing a support for the cams 13 that are mounted on the shear tube 14 disposed in openings in the cam assembly. The shear tube 14 is constructed of glass, porcelain, or other desirable material designed to shear under a load slightly below the safe limit of the cable's breaking strength, forming a part of the device and to be hereinafter more fully described.

At the ends of the bores in which the shear tube 14 is mounted, are shear tube keeper wires 15 that have right angled ends 16 which act as stops to prevent the shear tube from working through the openings in which it is positioned.

Leaf springs indicated at 17 are secured to the rear cam assembly body and engage the cams 13, normally pressing the cam faces against the duct. A screw eye indicated at 18 is secured to the front cam assembly body 7 and affords means to be engaged by a grappling device not shown, in the event that the apparatus should become stuck within the duct at a point close to the end of the duct to obstruct the duct, as when the crawler arrives at the bushing at the end of the duct.

The reduced portion 9 of the front cam assembly 7, is formed with a slot in which the pulley 19 operates, the pulley 19 being mounted on the shaft 20 that extends across the slot. The reference character 21 indicates an anchor pin which extends across the cut-out portion or slot 22 of the reduced portion 9 of the rear cam assembly 6 and to which one end of the operating cable 23 is secured, the operating cable passing over the pulley 19 and extending through the bore 24 formed longitudinally of the rear cam assembly 6, the cable being provided with a knot or other suitable stop 25 which provides a stop for engagement with one end of the front cam assembly, to limit movement of the cable 23, with respect to the apparatus.

In the rear assembly body 6 is the cut-out portion 26 in which the cams 27 are mounted, the cams 27 being arranged adjacent to each other and mounted on the shear tube 28 constructed of glass, porcelain, or other suitable material to break under a predetermined strain which may be intentionally directed to the cams 27, by a stronger pull on the operating cable than is required to operate the device, if the device encounters an obstruction in the duct. The destruction of the shear tubes 14 and 28 permits the device to be withdrawn from the duct by the operating cable.

It might be further stated that the strength of the shear tubes is slightly less than the strength of the cable and provides a guard to insure against the cable breaking under excessive strains.

The cams 27 are normally held against the inner surface of the duct by means of the leaf springs 29 that bear against the peripheries of the cams 27, the cams being designed to rotate in the desired direction under the action of the leaf springs 29 and 17. It is obvious that the contact between the cam and duct surfaces can be effectively maintained by any other type of spring arrangement than the particular leaf spring arrangement here described.

In operation, the duct crawler is inserted in the electrical duct. When the cable 23 is pulled, the front cam assembly 7 remains stationary with the cams 13 gripping the conduit 5, the rear cam assembly 6 moving forward, compressing the spring 10. When the cable is released the compressed spring 10 forces the rear cam assembly 6 backward, whereupon the rear cams grip the conduit and lock the rear assembly in place, while the front cam assembly moves forward carrying the cable and pulley 19 with it. In carrying the pulley forward the front cam assembly pulls twice as much cable into the duct as was pulled out when the spring was compressed. Repeated pulling and releasing of the cable causes the duct crawler to advance through the conduit.

This operation of pulling and releasing the cable 23 is repeated until the apparatus finally is fed with a step by step motion, throughout the entire length of the duct 5, whereupon the apparatus when pulled from the duct, will carry with it the wire rope or cable which has been threaded through the duct.

Having thus described the invention, what is claimed is:

An apparatus for feeding a flexible element through a conduit, comprising a pair of hollow cam assembly members arranged in axial alignment, said cam assembly members having their adjacent ends reduced, and having elongated openings in the walls thereof, pairs of cams mounted in each hollow cam assembly member and being extensible through said openings in the walls thereof, springs within the cam assembly members engaging said cams normally urging said cams through said openings into engagement with the wall of the conduit through which the apparatus is fed, a coiled spring having its ends fitted over the reduced ends of said cam assembly members normally biasing the cam assembly members apart, and manually controlled means for alternately moving the assembly members towards each other and releasing said assembly members to the action of said coiled spring feeding the apparatus with a step by step motion through such conduit.

EDGAR W. OLSON.

References Cited in the file of this patent

UNITED STATES PATENTS

| Number | Name | Date |
|---|---|---|
| 450,206 | Wessel | Apr. 14, 1891 |
| 880,677 | Mars | Mar. 3, 1908 |

FOREIGN PATENTS

| Number | Country | Date |
|---|---|---|
| 611,558 | Germany | Mar. 14, 1935 |